March 13, 1962  D. M. FIGERT  3,025,233
FILTER
Filed Nov. 3, 1961
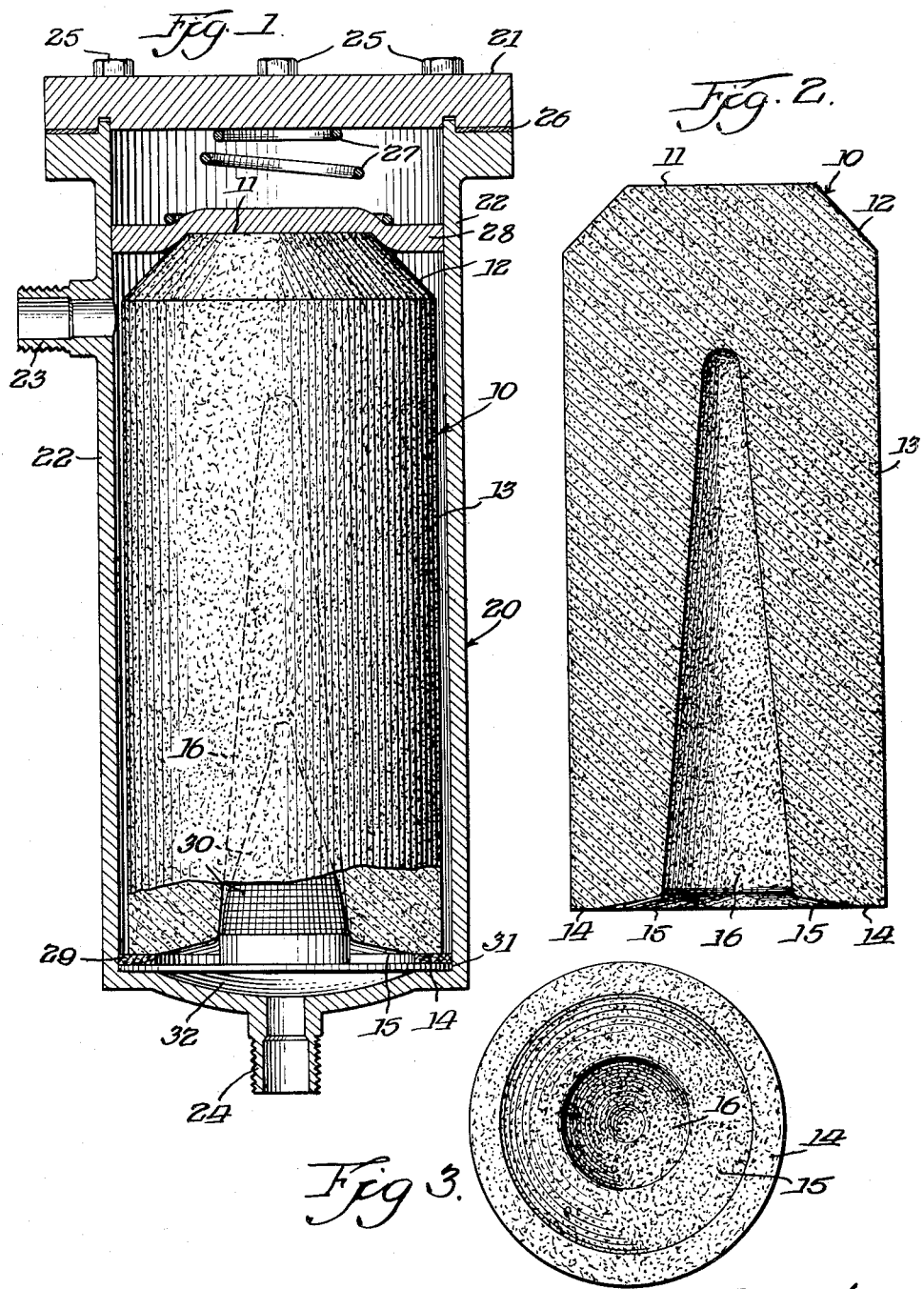
Inventor:
Donald M. Figert.
By Merriam, Smith, & Marshall
ATTORNEYS United States Patent Office 3,025,233
Patented Mar. 13, 1962

3,025,233
FILTER
Donald M. Figert, Washington, D.C., assignor to The Briggs Filtration Co., Washington, D.C., a corporation of Maryland
Filed Nov. 3, 1961, Ser. No. 149,903
5 Claims. (Cl. 210—502)

This invention relates to integral porous cores for filtering, drying and removing acids from refrigeration or air conditioning systems, the composition of said cores, and methods of making said cores.

The introduction of moisture in conventional refrigeration systems tends to cause the water to chemically react with the refrigerant and refrigerant oil to form acids which, in turn, corrode the internal parts of the system and break down the oil. Once the oil undergoes decomposition, sludge is introduced into the system and motor burnouts result.

Furthermore the presence of a trace of moisture in the refrigerant causes ice to be formed as the refrigerant passes through the expansion valve, which interferes with the operation of the expansion valve. It is only necessary for the usual refrigerant to be contaminated with traces of moisture to cause the formation of sufficient ice to interfere with the operation of the expansion valve.

During the normal operation of refrigeration systems, foreign matter such as scale, solder particles, dirt, and the like tends to circulate through the system causing progressive deterioration of the system (e.g., plugs up solenoid valves and expansion valves, etc.) and reducing the capacity of the system.

My invention contemplates the production of molded, integral porous cores which serve to effectively remove moisture and acids from refrigeration oils and refrigerants and filter foreign matter and sludge from the system. These cores do not powder or pass into the system, do not pack or cause a high pressure drop at full fluid flow through the core, do not permit the refrigerant to channel around or through the desiccant particles, filter foreign matter as minute as nine microns, and provide an unusually large and highly effective filtering area which possesses high adsorption capacity.

My cores may be operatively retained in metal shells having inlet and outlet means. The fluid to be treated, sequentially, enters the filter-drier assembly through the inlet means, passes through the porous core, and leaves the assembly through the outlet means. In such assemblies, the fluid must pass through the core before leaving the assembly.

Generally, the filter-drier assembly will be used to filter and dry the refrigerant when it is in thbe liquid phase. Therefore, the assembly will be installed between the condenser and expansion valve in the refrigeration system. The installation of the assembly in the liquid line ahead of solenoid valves, expansion valves or capillary tubes is recommended. When used in commercial, industrial, and low temperature installations, the assembly should be placed in the liquid line between any heat exchanger and the expansion valve and, if possible, within the refrigerated space. On the other hand, if desired, the assembly may be used to filter and dry gaseous refrigerants.

In the accompanying drawings:

FIGURE 1 is a longitudinal sectional view of one embodiment of my filter-drier assembly with a portion of the core broken away;

FIGURE 2 is an elevational view of the core; and

FIGURE 3 is a bottom plan view of the core shown in FIGURE 2.

Referring to the drawings, the filter-drier assembly comprises an integral porous core 10 retained in a metal shell 20. The shell 20 has a removable end plate 21 which is sealably secured to the gasket 26 and cylindrical casing 22 by means of bolts 25. The casing 22 is provided with threaded inlet means 23 positioned at one end and threaded outlet means 24 located at the other end.

The cylindrical, integral, porous core 10 has an elongated cylindrical surface 13 which has an adjoining tapered annular surface 12 and flat surface 11 at one end and, at the other end, an adjoining annular surface 14, frusto-conical depression 15, and a tapered, annular internal channel 16.

A spring 27 is positioned between the end plate 21 and core retainer plate 28. This spring serves to urge the plate 28 against the core 10 which, in turn, urges the core against the gasket 29. The plate 28 provides a frusto-conical seat which securely receives and retains the flat surface 11 and tapered surface 12 of the core 10 in spaced relation to the cylindrical casing 22 of the shell 20.

An outlet strainer assembly having a foraminous metal strainer sleeve 30 and annular, outwardly extending flange 31 secured thereto is positioned at the outlet end of the assembly. The closed end of the sleeve 30 is adapted to extend into the annular channel 16 of the core 10 while the flange 31 is firmly positioned between the gasket 29 and outlet end of the shell 20.

The spring 27 thus serves to firmly position the core 10 between the plate 28 and gasket 29. The frusto-conical seat provided by the plate 28 enables the core 10 to be centered inside the shell 20 and maintained in spaced relationship to the casing 22. This suspension mounting of the core 10 inside the shell 20 reduces the transmission of shock from the shell to the core, thus obviating or reducing fracturing of the core.

The cavity 32 formed between the strainer flange 31 and adjacent convex end of the shell 20 is shaped like a segment of a sphere and communicates with the outlet 24.

In operation, fluid enters the assembly through inlet means 23 of the shell 20, passes laterally through the core along the cylindrical surface 13 to the cylindrical tapered channel 16, passes through the strainer sleeve 30 into the cavity 32, and leaves the assembly in a dry and filtered state through outlet means 24.

The integral porous core contains crystalline zeolite molecular sieve, partially dehydrated aluminum hydroxide gel or activated alumina gel, activated alumina, and an inert binder. In forming the core, crystalline zeolite molecular sieve, partially dehydrated aluminum hydroxide gel or activated alumina gel, and either hydrated alumina or activated alumina are blended, in proper proportions, in the presence of water. Although I prefer to include the use of activated alumina gel in forming my core, and improved results are obtained from its use, if desired, it may be omitted from the blend. The blend is then pressed into the desired shape and fired at about 650° F. to form a hard, integral porous core. During the firing step, water which is adsorbed by the crystalline zeolite molecular sieve and partially dehydrated aluminum hydroxide gel or activated alumina gel is removed, and the hydrated alumina is activated by the removal of water of hydration.

When activated alumina, instead of hydrated alumina, is added to and blended with the other constituents, in the presence of water, it will be present in the aqueous mix as saturated alumina. It is, obviously, more economical to use hydrated alumina in forming the mix and activate the hydrated alumina during the firing step.

The crystalline zeolite molecular sieves used for purposes of the invention include a wide variety of hydrated metal aluminosilicates, both natural and synthetic, which possess a crystalline structure. The outstanding characteristic of these zeolite materials is their ability to undergo dehydration with little or no change in their crystalline structure to provide a network of regularly spaced channels or pores of molecular dimensions comprising up to about 50 percent of the total volume of the crystal. The empty cavities in these activated or dehydrated molecular sieve crystals have a strong tendency to recapture the water molecules that have been driven off.

The structure of crystalline zeolite molecular sieves can be described as an open three-dimensional framework of $SiO_4$ and $AlO_4$ tetrahedra. The tetrahedra are cross-linked by the sharing of oxygen atoms whereby the ratio of oxygen atoms to the total of the aluminum and silicon atoms is equal to two, or $O/Al+Si=2$. The negative electrovalence of tetrahedra containing aluminum is balanced by the inclusion within the crystal of cations, for example, alkali metal and alkaline earth metal ions.

Crystalline zeolite molecular sieves suitable for use are metal aluminosilicates having uniform pore structure represented by the formula:

$$M_{2/n}O:Al_2O_3:wSiO_2:yH_2O$$

wherein M represents a cation, $n$ represents the valence of the cation, $w$ the moles of $SiO_2$, and $y$ the moles of $H_2O$.

One synthesized zeolite, designated Zeolite–X (see U.S. Patent 2,882,244), can be represented by composition as follows:

$$0.9\pm0.2M_{2/n}O:Al_2O_3:2.5\pm0.5SiO_2:yH_2O$$

wherein M represents a cation having a valence of not more than three, $n$ represents the valence of M, and $y$ represents any value up to eight depending on the identity of M and the degree of hydration of the crystals. The pore size of the synthesized crystalline zeolite designated as Zeolite–X may range between about 8 and about 11 Angstrom units. A typical composition for the sodium form, having a pore size of about 11 Angstrom units, may be represented as:

$$0.9Na_2O:Al_2O_3:2.5SiO_2:6.1H_2O$$

Another synthesized crystalline zeolite, designated Zeolite–A (see U.S. Patent 2,882,243), has a pore size ranging from about 3 to about 5 Angstrom units and can be represented by composition as:

$$1.0\pm0.2M_{2/n}O:Al_2O_3:1.85\pm0.5SiO_2:yH_2O$$

wherein M represents a metal, $n$ is the valence of M, and $y$ represents any value up to about 6. The as-synthesized Zeolite–A contains primarily sodium cations and is designated sodium Zeolite–A.

Among the natural crystalline zeolite molecular sieves which can be used are: mordenite and gmelinite, which have a pore size of about 3 to 4 Angstrom units; chabazite, erionite and analcite, which have a pore size of about 3 to 5 Angstrom units; and faujasite, which has a pore size of about 8 to 11 Angstrom units.

Among the outstanding properties of these crystalline zeolite molecular sieves is their ability to maintain a high sorption capacity at low sorbate concentrations. For example, they adsorb a high level of water even when the water content of the fluid being treated is very low; on the other hand, conventional desiccants tend to lose their adsorption capacity as the concentration of water in the fluid being treated decreases. Although crystalline zeolite molecular sieves have a comparatively high adsorption capacity, they have limited filtering ability, when used alone, to provide full fluid flow with a negligible pressure drop and provide the retention of finely divided particulate matter; however, when crystalline zeolite molecular sieves are blended in accordance with my formulation, a molded integral core may be formed which not only possesses excellent moisture sorption capacity but, in addition, has the ability to filter fluids under full flow with a negligible pressure drop through the core and retain the previously described finely divided particulate matter. Furthermore, crystalline zeolite molecular sieves lend some strength properties to the molded integral core, especially in the event spherical particles are used (spherically shaped particles are stronger under compression load than ordinary non-spherical granular particles). Linde Air Products Company produces crystalline zeolite molecular sieves, such as hydrated crystalline sodium and calcium aluminosilicates, which are identified as molecular sieves Types–4A and –5A, respectively; molecular sieve Type 4A (8 x 12 mesh spheres), a Zeolite–A, is preferred over the Type 5A product, a Zeolite–A. Further, molecular sieve 13–X (a Zeolite–X), a product of Linde Air Products Company, may be used.

The partially dehydrated aluminum hydroxide gel or activated alumina gel has a high adsorption capacity, although lower than the aluminosilicate component, and lends excellent strength properties to the molded integral core, especially in the event spherical particles are used (spherical particles are stronger under compression load than ordinary non-spherical granular particles). Furthermore, the activated alumina gel minimizes the pressure drop through the molded integral core. The activated gel may be produced by spray drying aluminum hydroxide gel, forming spherical alumina gel balls from the dried gel, and activating the spherical gel powder at elevated temperatures so as to remove most of the combined water. Excellent results are obtained with activated alumina H–151 balls, produced by Aluminum Company of America, having a diameter of ⅛ inch. A typical chemical analysis of activated alumina H–151 is as follows:

| | Percent |
|---|---|
| $Al_2O_3$ | 86.0 |
| $Na_2O$ | 1.0 |
| $Fe_2O_3$ | 0.15 |
| $SiO_2$ | 6.3 |
| Loss on ignition | 6.2 |

The activated alumina present in the fired core serves as an adsorbent or desiccant and is formed from either hydrated alumina or saturated alumina during the firing of the shaped blend. Regardless of whether hydrated alumina or activated alumina is added to the aqueous mix, they will be present in the mix as either hydrated or saturated alumina, respectively, until the molded mix is fired. The adsorption capacity of activated alumina in the fired core is lower than the adsorption capacity of activated alumina H–151, and still lower than the adsorption capacity of the aluminosilicate component. The presence of alumina in the core permits the molded integral core to possess excellent filtration characteristics and permits full fluid flow through the core with negligible pressure drop. In addition, the activated alumina lends some strength properties to the fired core. Commercial hydrated alumina such as C–40, a product of Aluminum Company of America, may be used. For example, excellent results are obtained with a mix of equal parts by weight of 28 x 42 mesh C–40 and 20 x 32 mesh C–40.

The bonding material must have high bonding strength, be inert (i.e., does not react with the fluid being filtered and does not destroy the filtering properties of the constituents of the porous barrier or core), be water-insoluble, permit fluid to flow between the particles in the core, enable the desiccant particles to retain their adsorption capacity, and permit the core to filter fluids under full flow with a negligible pressure drop. Inorganic binders such as aluminum phosphate binders of the type disclosed in U.S. Patent No. 2,405,884 or, if desired, sodium silicate binders may be used. Organic binders such as phenol-formaldehyde, melamine-formaldehyde, and epoxide (glycidal polyether formed from epichlorohydrin and Bisphenol–A) resins may be used.

My solid, integral, molded porous core may be produced by mixing crystalline zeolite molecular sieve with activated alumina gel and adding water during mixing so as to saturate the mix. The water is then permitted to diffuse throughout the mix. An appropriate, predetermined amount of the mix is placed and mixed with the binder and hydrated alumina in a muller type mixer. After the resulting blend is properly mixed, an appropriate portion of the blend is pressed into the desired shape and fired at 650° F. so as to remove water of hydration from the hydrated alumina and adsorbed water from the crystalline zeolite molecular sieve and activated alumina gel. The same procedure may be used when activated alumina gel is not used in making the core.

As a general rule, approximately 30% by weight water based on the weight of crystalline zeolite molecular sieve and activated alumina gel (when the gel is used) is required in order to saturate these solid desiccants. About 16.25 to 26.25 pounds of aluminum phosphate binder such as disclosed in U.S. Patent No. 2,405,884 are generally required to properly bond 100 pounds of the mixture of dry desiccants present in the blend.

The following proportions of constituents (based on the total weight of the desiccants) may be used in the mix in making my cores:

| | Percent by weight |
|---|---|
| Crystalline zeolite molecular sieve | 5–25 |
| Hydrated alumina | 50–95 |
| Activated alumina gel | 0–25 |

However, I prefer using the following formulation:

| | Percent by weight |
|---|---|
| Crystalline zeolite molecular sieve | 7–12 |
| Hydrated alumina | 77–87 |
| Activated alumina gel | 7–12 |

If activated alumina is used in the aqueous mix in place of hydrated alumina, it will become saturated with water present in the mix in an amount equivalent to the amount of water of hydration introduced into the mix when hydrated alumina is used. Thus, the level of saturated alumina present in the aqueous mix should be equivalent to the above-described proportions of hydrated alumina.

Alternatively, the following proportions of constituents (based on the total weight of the desiccants) may be present in the fired, molded cores:

| | Percent by weight |
|---|---|
| Crystalline zeolite molecular sieve | 7–31 |
| Activated alumina | 39–93 |
| Activated alumina gel | 0–31 |

However, I prefer making cores which have the following proportions of desiccants:

| | Percent by weight |
|---|---|
| Crystalline zeolite molecular sieve | 9–15 |
| Activated alumina | 70–84 |
| Activated alumina gel | 9–15 |

The term "activated alumina" in the above fired core formulations may be formed from hydrated alumina or saturated alumina present in the aqueous blend.

The following examples exemplify various compositions and processes which may be used to form my integral porous core.

*Example I*

50 pounds of "Linde" molecular sieve Type 5A (spherical particles of 8 x 12 mesh) and 50 pounds of activated alumina H–151 are mixed in a revolving open mixer. 30 pounds of water are then sprayed into the mix, over a two-minute interval, during mixing. Mixing of the aqueous mix is continued for approximately five minutes. The blend is then discharged into a metal, moisture-impervious sealed drum which is capable of preventing loss of water by evaporation and permits the diffusion of water within the blend. The blend should be stored in the drum for at least 24 hours to permit completion of diffusion.

13 pounds of the blend is mixed with 12.75 pounds of the aluminum phosphate binder disclosed in U.S. Pat. No. 2,405,884 and 50 pounds of hydrated alumina (i.e., an admixture of 28 x 42 mesh C–40 and 20 x 32 mesh C–40) in a muller type mixer. After the blend is mixed for about 15 minutes, it is weighed, pressed into the desired shape, and fired at 650° F. so as to remove the water of hydration from the hydrated alumina and remove adsorbed water from the alumina gel and crystalline zeolite molecular sieve. During the firing step, the bonding material firmly sets the shaped core and a solid, integral porous core is formed.

The procedure set forth in Example I may be used in forming cores by properly admixing the following levels of desiccants:

*Example II*

| | Parts by weight |
|---|---|
| Hydrated alumina (C–40) | 314 |
| Aluminum phosphate binder (U.S. Pat. No. 2,405,884) | 80 |
| Crystalline zeolite molecular sieve (molecular sieve Type 4A) | 30 |
| Activated alumina gel (activated alumina H–151) | 30 |

*Example III*

| | Parts by weight |
|---|---|
| Hydrated alumina (C–40) | 317 |
| Aluminum phosphate binder (U.S. Pat. No. 2,405,884) | 80 |
| Crystalline zeolite molecular sieve (molecular sieve Type 4A) | 30 |
| Activated alumina gel (activated alumina H–151) | 27 |

*Example IV*

| | Parts by weight |
|---|---|
| Hydrated alumina (C–40) | 324 |
| Aluminum phosphate binder (U.S. Pat. No. 2,405,884) | 80 |
| Crystalline zeolite molecular sieve (molecular sieve Type 4A) | 30 |
| Activated alumina gel (activated alumina H–151) | 20 |

*Example V*

| | Parts by weight |
|---|---|
| Hydrated alumina (C–40) | 334 |
| Aluminum phosphate binder (U.S. Pat. No. 2,405,884) | 80 |
| Crystalline zeolite molecular sieve (molecular sieve Type 4A) | 30 |
| Activated alumina gel (activated alumina H–151) | 10 |

*Example VI*

| | Parts by weight |
|---|---|
| Hydrated alumina (C–40) | 331 |
| Aluminum phosphate binder (U.S. Pat. No. 2,405,884) | 80 |
| Crystalline zeolite molecular sieve (molecular sieve Type 4A) | 30 |
| Activated alumina gel (activated alumina H–151) | 13 |

*Example VII*

| | Parts by weight |
|---|---|
| Hydrated alumina (C–40) | 304 |
| Aluminum phosphate binder (U.S. Pat. No. 2,405,884) | 80 |
| Crystalline zeolite molecular sieve (molecular sieve Type 4A) | 30 |
| Activated alumina gel (activated alumina H–151) | 40 |

*Example VIII*

| | Parts by weight |
|---|---|
| Hydrated alumina (C–40) | 340 |
| Aluminum phosphate binder (U.S. Pat. No. 2,405,884) | 80 |
| Crystalline zeolite molecular sieve (molecular sieve Type 4A) | 34 |

*Example IX*

| | Parts by weight |
|---|---|
| Hydrated alumina (C–40) | 344 |
| Aluminum phosphate binder (U.S. Pat. No. 2,405,884) | 80 |
| Crystalline zeolite molecular sieve (molecular sieve Type 4A) | 30 |

This application is a continuation-in-part of my allowed, copending application Serial No. 674,945, filed July 29, 1957.

The foregoing detailed description has been given for clearness of understanding only, and no unnecessary limitations should be understood therefrom, as modifications will be obvious to those skilled in the art.

What is claimed is:

1. A porous barrier suitable for filtering and drying fluids comprising about 7%–31% of a crystalline zeolite molecular sieve, about 39%–93% of activated alumina and an inert, water-insoluble binder that permits fluids to pass through and be filtered by said porous barrier.

2. An integral, shaped porous core suitable for filtering and dry fluids comprising about 7%–31% of a crystalline zeolite molecular sieve and about 39%–93% of activated alumina, said crystalline zeolite and activated alumina being bonded together with an inert water-insoluble binder that permits fluids to pass through and be filtered by said shaped porous core.

3. An integral, shaped porous core suitable for filtering and drying fluids having about 7%–31% of a crystalline zeolite molecular sieve, about 39%–93% of activated alumina, and up to about 31% of activated alumina gel, said crystalline zeolite, activated alumina and activated alumina gel being bonded together with an inert water-insoluble binder that permits fluids to pass through and be filtered by said shaped porous core.

4. A moldable blend suitable for filtering and drying fluids after being hardened by firing at elevated temperatures to a porous structure, which comprises an admixture of about 5%–25% of a crystalline zeolite molecular sieve, about 0%–25% of activated alumina gel, about 50%–90% of a member of the class consisting of hydrated alumina and saturated alumina, and an inert, water-insoluble binder for said admixture that permits fluids to pass through and be filtered by said porous structure that is produced from said moldable blend by hardening said blend by firing at elevated temperatures.

5. A porous barrier suitable for filtering and drying fluids comprising about 7%–31% of a crystalline zeolite molecular sieve, and about 39%–93% of activated alumina, wherein said crystalline zeolite and activated alumina are bonded together with a member of the class consisting of inert phosphate binders, inert silicate binders, and inert synthetic organic resin binders.

No references cited.